United States Patent Office 3,389,139
Patented June 18, 1968

3,389,139
6-HOMOPIPERAZINO AND PIPERAZINO-MORPHANTHRIDINES
Jean Schmutz, Muri, near Berne, and Fritz Hunziker and Franz Martin Künzle, Berne, Switzerland, assignors to Dr. A. Wander, S.A., Berne, Switzerland, a corporation of Switzerland
No Drawing. Continuation-in-part of application Ser. No. 374,158, June 10, 1964. This application June 2, 1966, Ser. No. 554,670
5 Claims. (Cl. 260—268)

ABSTRACT OF THE DISCLOSURE (A) 6-basic substituted morphanthridines having the following structural formula:

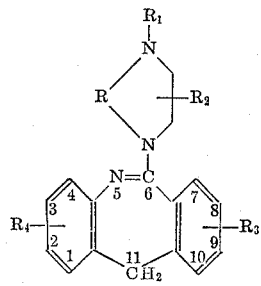

wherein R denotes a member of the group consisting of ethylene, trimethylene, and methylethylene, $R_1$ is a member of the class consisting of hydrogen, lower alkyl, lower hydroxyalkyl, acetoxy lower alkyl, and alkoxyalkyl having not more than 5 carbon atoms, $R_2$ denotes a member of the class consisting of hydrogen and methyl, and $R_3$ and $R_4$ are the same or different and denote members of the class consisting of hydrogen, halogen, and lower alkyl; and (B) physiologically acceptable acid addition salts of (A).

The disclosed compounds exhibit marked motility depressing action and are useful as neuroplegics, neuroleptics and analgesics. In addition the 6-piperazinyl substituted compounds exhibit strong cataleptic acid and are therefore suitable for the treatment of psychotic conditions.

---

This application is a continuation-in-part of our co-pending U.S. patent application Ser. No. 374,158, now abandoned, filed on June 10, 1964.

This invention is generally concerned with heterocyclic compounds showing an amidine structure, and more specifically with 6-basic substituted morphanthridines of the general formula:

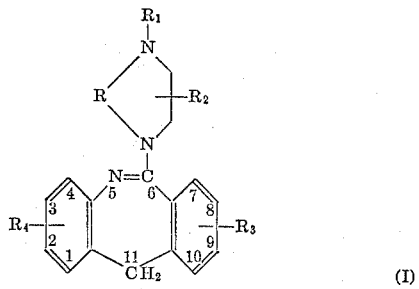

and acid addition salts thereof. In Formula I, R denotes ethylene, trimethylene, or propylene (methylethylene); $R_1$ denotes hydrogen, lower alkyl, lower hydroxyalkyl, acylated lower hydroxyalkyl, or alkoxyalkyl having not more than 5 carbon atoms; $R_2$ denotes hydrogen or methyl; and $R_3$ and $R_4$ are the same or different and denote hydrogen, halogen, or lower alkyl. The term "lower" alkyl etc. is intended to mean alkyl etc. having from 1 to 3 carbon atoms. Preferred compounds within the range of this invention are those wherein the basic substituent in 6-position is the 4-methyl-1-piperazinyl residue. Halogen or lower alkyl substituents in the benzene nuclei are preferably in the 3- or 8-positions. Preferred specific compounds falling within the range of this invention are 6-(4-methyl - 1 - piperazinyl) - morphanthridine, 3 - chloro-6 - (4 - methyl - 1 - piperazinyl) - morphanthridine, 6-(4 - methyl - 1 - piperazinyl) - 8 - chloromorphanthridine, 6 - (4 - methyl - 1 - piperazinyl) - 8 - methyl - morphanthridine, and the physiologically acceptable acid addition salts thereof.

The compounds of this invention are obtained by reacting a reaction mixture containing nitrilium or imonium cations of the formulae:

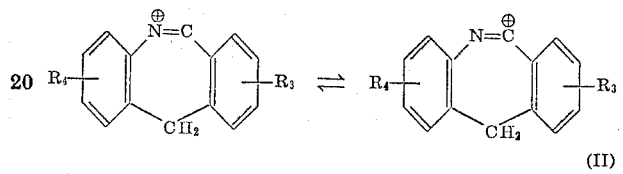
(II)

wherein $R_3$ and $R_4$ have the above-mentioned meaning, with an amine of the formula:

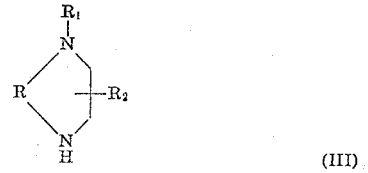
(III)

wherein R, $R_1$ and $R_2$ have the indicated meaning.

Nitrilium or imonium cations of Formulae II can be regarded as dissociation products of compounds of the formula:

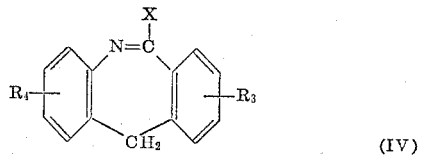
(IV)

wherein $R_3$ and $R_4$ have the above-mentioned meaning, and X represents a halogen atom, the sulfhydryl group, or an alkoxy or alkylthio group which is activated if required, e.g. the p-nitrobenzylthio group. Such compounds (IV) are obtained, for instance, by conversion of lactams of the formula:

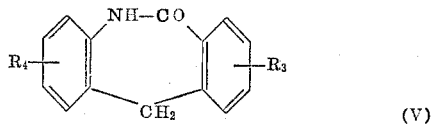
(V)

wherein $R_3$ and $R_4$ have the above-mentioned meaning, into the thiolactams, if required with subsequent alkylation of the latter, or by reacting the lactams (V) with a halogenating agent like phosphoroxychloride or phosphorus pentachloride, preferably in the presence of catalytic amounts of dimethylaniline or dimethylformamide. The lactams (V) can be obtained, for example, by ring closure of suitable o-isocyanato-diphenylmethanes with aluminium chloride. Depending upon the chemical nature of the residue X and also of eventual nuclear substituents, the compounds (IV) in the reaction mixture obtained are dissociated to a higher or lower degree into the nitrilium or imonium cations, so that the reaction mixtures can be used directly for reacting with the amine of Formula III. In part the compounds of Formula IV produced in this or in another manner can be isolated in undissociated form and then yield the desired nitrilium or imonium cations (II) upon dissolution in a suitable, preferably polar solvent, if required by heating and in the presence of the amine of Formula III, which can also serve as a solvent. Reaction mixtures containing cations of Formulae II can also be produced, for example, by intramolecular Ritter's reaction (action of a nitrile group on a phenyl cation) in o-cyanodiphenylmethanes, by Beckmann's transformation of (if desired halogenated) anthronoximes, or by Schmidt's reaction of (if desired halogenated) anthrones with hydrazoic acid. Both the last-named reactions may lead, if the starting material consists of unsymmetrically halogenated anthronoximes or anthrones, to isomeric products which, if necessary, must be subsequently separated. In the said reaction mixtures the anionoid components which may appear are—besides those derived from the substituent X of Formula IV, depending upon the mode of preparation of the cations (II), for example also anions of sulphuric, toluene sulphonic, phosphoric, hydrofluoric, or hydrofluoboric acids, etc.

Compounds in accordance with this invention are also obtained by dehydration of urea derivatives of the formula:

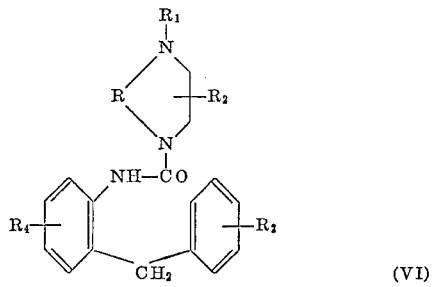

(VI)

wherein R, $R_1$, $R_2$, $R_3$ and $R_4$ have the meaning indicated above, for instance through several hours' action by dehydrating agents like zinc dichloride, aluminium chloride, tin tetrachloride, phosphoric acid and the like, but preferably phosphoroxychloride, if required in the presence of an inert solvent with a suitable boiling point, such as benzene, toluene, etc.

Compounds according to this invention are also obtained by ring closure, through intramolecular condensation, of acid amides of thioamides of the formula:

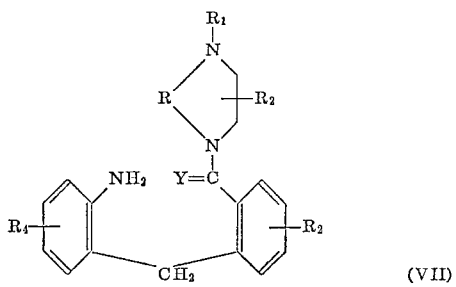

(VII)

wherein R, $R_1$, $R_2$, $R_3$ and $R_4$ have the above-mentioned meaning, and Y represents an oxygen or sulphur atom. A purely thermal condensation cannot usually be successfully carried out with the acid amides, which, in turn, are produced, for example, by reduction of suitable nitro compounds, but it can rather in the case of the thioamides, which are obtained, for example, by treating the acid amides with phosphoric pentasulphide and do not require to be isolated prior to the subsequent condensation. Especially in the case of the acide amides it is useful to work in the presence of condensing agents, such as phosphoric pentachloride, phosphoroxychloride, phosgene, polyphosphoric acid, and the like. It is to be supposed that the ring closure involved goes partly through intermediate stages, like imide chlorides, amide chlorides, imidophosphates, amidophosphates or salt-like derivatives thereof, which can not generally be isolated. Condensation of the thioamides may be aided by the presence of mercury salts or by intermediate formation of (if desired activated) imido thio ethers. Heating and, if required, the use of an inert diluent are useful when working with phosphoroxychloride and phosphoric pentachloride, as also the addition of catalytic amounts of dimethylformamide or dimethylaniline.

Compounds in accordance with this invention can further be prepared by reacting primary amines of the formula:

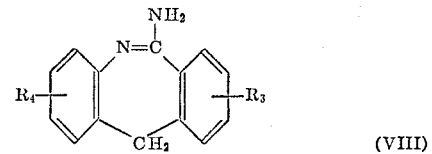

(VIII)

wherein $R_3$ and $R_4$ have the above-mentioned meaning, with reactive esters of alcohols having the formula:

(IX)

wherein R, $R_1$ and $R_2$ have the meaning identified above, for instance with hydrohalic, carbonic, sulphonic, or p-toluene sulphonic acid esters, if desired under prior or simultaneous action by a basic catalyst or metallizing agent like sodium amide, lithium amide, sodium hydride, butyl lithium, phenyl sodium, sodium ethylate or potassium-t-butylate. The primary amines of Formula VIII are obtained by treating a reaction mixture containing nitrilium or imonium cations of Formulae II with ammonia.

In so far as by one of these processes compounds are obtained, wherein $R_1$ denotes hydrogen, substituents $R_1$ other than hydrogen may subsequently be introduced by reaction of the secondary amides with reactive esters of alcohols of the formula $R_1$—OH, using the same methods as described above.

The bases (I) obtained in the manner just described are in most cases crystallizable, otherwise they can be distilled under high vacuum without decomposition, and they form with inorganic and organic acids, e.g. hydrochloric, hydrobromic, sulphuric, nitric, phosphoric, acetic, oxalic, tartaric, toluene sulphonic acid and the like, addition salts which are stable in water and in which form the products can likewise be used.

The 6-basic substituted morphanthridines and their acid addition salts described above are new compounds which are used as active substances in medicines or as intermediates for the manufacture of such substances. In particular the products are useful as neuroplegics, neuroleptics and analgesics. This utility is manifested pharmacologically by considerable depression of motility in mice, which can be shown by measuring the locomotor activity in accordance with the method of Caviezel and Baillod [Pharm. Acta Helv. 33, 469 (1958)]. In the following Table I, the locomotor activity obtained with some compounds of this invention, as well as their toxicity, are compared with the corresponding data of chloropromazine.

TABLE I

| Active substance | Toxicity (mouse) LD, 50 mg./ kg. p.o. | Locomotor activity (mouse) ED, 50 mg./ kg. p.o. |
| --- | --- | --- |
| Chloropromazine | 135 | 3.5 |
| 6-(4-methyl-1-piperazinyl)-morphanthiridine | 415 | 1.7 |
| 6-(4-methyl-1-piperazinyl)-8-chloro-morphanthridine | 180 | 0.18 |
| 3-chloro-6-(4-methyl-1-piperazinyl)-morphanthridine | 530 | 4.6 |
| 6-(4-methyl-1-piperazinyl)-8-methyl-morphanthridine | 230 | 0.062 |

Some of the substances show, in addition to the motility depressing action, a strong cataleptic action, and therefore, are suitable for the treatment of psychotic conditions.

The compounds of this invention can be administered in the form of pharmaceutical preparations containing, besides the active substance, organic or inorganic solid or liquid carriers suitable for enteral or parenteral administration. The pharmaceutical preparations may be, for example, in the form of tablets, dragees, or solutions for injection, one dosage unit containing from 1 to 50 mg. of active substance, depending on its nature, on the route of administration and on the physician's prescription, the effective daily dose amounting to from 10 to 500 mg. of active substance.

Example 1

A mixture of 4.9 gm. of 5,6-dihydro-6-oxo-morphanthridine, 37 ml. of phosphoroxychloride and 1.5 ml. of dimethylaniline is heated for three hours at reflux. The viscous oil, obtained by evaporation of the reaction mixture in vacuo at 60° C., is diluted with 20 ml. of absolute dioxane and, after adding 30 ml. of N-methylpiperazine, heated for 4 hours at reflux. The resulting clear solution is evaporated in vacuo at 60° C. to dryness. The residue is distributed between ether and ammonia water. The ethereal solution is separated, washed with water and then extracted with 1 N acetic acid. The acetic acid extract is mixed with ammonia water and then extracted with ether. The ethereal solution is washed with water, dried over sodium sulphate, filtered through alumina and evaporated. The residue is caused to crystallize from ether/petroleum ether, and recrystallized from acetone/petroleum ether. 6.0 gm. (88% of the theory) of 6-(4-methyl-1-piperazinyl)-morphanthridine of melting point 138–138.5° C. are obtained.

The 5,6-dihydro-6-oxo-morphanthridine used as a starting material is usefully obtained in the following way:

30.2 gm. of o-aminodiphenylmethane are dissolved in 65 ml. of absolute toluene and, while stirring and at a temperature of between 0° and −10° C., 140 ml. of 20% phosgene solution in toluene are added drop by drop. By bubbling phosgene slowly through it the milky mixture is heated within 30 minutes to reflux temperature, which is maintained during some 20 minutes. While stirring vigorously, dry nitrogen is passed into the boiling reaction mixture for 10 minutes. After evaporation of the solvent there are obtained by vacuum distillation 29.7 gm. (86% of the theory of o-isocyanatodiphenylmethane of boiling point 169° C./12 mm. Hg.

21.1 gm. of aluminium chloride are heated in 110 ml. of o-dichlorobenzene to 80° C. and, while stirring, a solution of 29.7 gm. of o-isocyanatodiphenylmethane in 60 ml. of o-dichlorobenzene is added drop by drop, whereupon the temperature of the mixture rises to 120° C. This temperature is maintained for one hour while stirring. After cooling the reaction mixture is poured into 200 ml. of 2 N hydrochloric acid, whereupon a brown precipitate is formed. After steam distillation the residue is isolated by filtration and crystallized from acetone/water. There are obtained 28.6 gm. (97% of the theory) of 5,6-dihydro-6-oxo-morphanthridine of melting point 201–203° C.

Example 2

10 ml. of N,N-dimethylaniline are poured over 33.5 gm. of 5,6-dihydro-6-oxo-morphanthridine and, after adding 300 ml. of phosphoroxychloride, heated for 4 hours under reflux. The reaction mixture is evaporated in vacuo. The residue is suspended in absolute xylol. The residue obtained by evaporating the suspension in vacuo, is taken up in ether and poured over ice/water. The ethereal phase is separated and washed 3 times with dilute hydrochloric acid, the hydrochloric washing water being rewashed with ether. The combined ether phases are successively washed with water, sodium bicarbonate solution, water and saturated sodium chloride solution, dried over sodium sulphate, treated with active charcoal, filtered through alumina and largely concentrated by evaporation. Upon adding petroleum ether there are obtained 30.2 gm. (83% of the theory) of 6-chloromorphanthridine in the form of yellowish prisms of melting point 149–151° C.

7.5 gm. of the 6-chloromorphanthridine thus obtained are heated in 100 ml. of absoslute xylol with 15 ml. of N,N-dimethylaminoethylamine for 4 hours under reflux. The reaction mixture is mixed with water and concentrated soda lye. The aqueous phase is separated and washed with ether, and the ether used for washing is combined with the xylol phase. The organic phase is exhaustively extracted with dilute hydrochloric acid. The combined acid extracts are washed with ether, made alkaline with concentrated soda lye and then extracted with ether. The ethereal extract is washed with water and saturated sodium chloride solution, dried over sodium sulphate, treated with active charcoal and evoporated. The residue is taken up in petroleum ether. The solution is filtered through alumina and largely concentrated by evaporation. When the concentrated solution cools down white crystals are formed. There obtained 7.2 gm. of 6-(β-dimethylaminoethylamino)-morphanthridine of melting point 92–94° C.

Example 3

6.7 gm. of o-[(4-methyl-1-piperazinyl)carboxamido]diphenylmethane are heated with 75 ml. of phosphoroxychloride for 30 hours under reflux. The reaction mixture is evaporated in vacuo to dryness. While being cooled the residue is mixed with water and made alkaline with concentrated soda lye. The ethereal extract obtained by shaking twice with ether is washed twice with water and then exhaustively extracted with dilute hydrochloric acid. The combined hydrochloric extracts are washed with ether, made alkaline with concentrated soda lye and extracted twice with ether. The ethereal extract is washed with water and saturated sodium chloride solution, dried over sodium sulphate, filtered through alumina and evaporated. The residue is crystallized from petroleum ether. 3.0 gm. of 6-(4-methyl-1-piperazinyl)-morphanthridine of melting point of 138–138.5° C. are obtained. This product is identical to that of Example 1.

Example 4

16.6 gm. of 2-amino-diphenylmethane-2'-thiocarboxylic acid(4-methyl)piperazide are boiled under reflux with 17.0 gm. of finely powdered mercuriacetate in 200 ml. xylene during 24 hours. The reaction mixture is filtered and the filtrate is extracted with dilute acetic acid. The acid solution is treated with ammonia and extracted with ether. The ethereal solution is washed with water, dried over sodium sulphate, filtered through alumina and evaporated. The residue is crystallized from petroleum ether. 8.7 gm. of 6-(4-methyl-1-piperazinyl)-morphanthridine of melting point 138–138.5° C. are obtained; the product is identical to that of Example 1.

Example 5

A mixture of 8.0 gm. of 5,6-dihydro-6-oxo-8-methyl-morphanthridine, 2.5 ml. of N,N-dimethylaniline and 80 ml. of phosphoroxychloride is heated during 4 hours under reflux. The excess of phosphoroxychloride is then completely removed by distillation in vacuo, and the residue is dissolved in 150 ml. of xylene. The solution is poured on ice-water. The organic phase is separated, washed with diluted hydrochloric acid, soda solution and water, and dried with sodium sulphate. To the xylene solution containing the imidechloride, 15 ml. of N-methylpiperazine are added, and the mixture is heated for 5 hours under reflux. Upon cooling to room temperature, the reaction mixture is exhaustively extracted with diluted hydrochloric acid. The acid extracts are alkalized by addition of soda lye, and the base is extracted by shaking with ether. The ethereal extracts are washed with water and dried over sodium sulphate. The residue is crystallized from ether/petroleum ether, yielding 7.6 gm. of 6-(4-methyl-1-piperazinyl)-8-methyl-morphanthridine in the form of prisms of melting point 113–115° C.

In a like manner as in the examples previously mentioned there are obtained from the corresponding starting materials the products listed in the following Table II. $R$, $R_1$, $R_2$, $R_3$ and $R_4$ have the same meaning as mentioned above. In the last column A means acetone, C chloroform, E ether, and P petroleum ether.

B

| | Mg. |
|---|---|
| 6-(4-methyl-1-piperazinyl)-morphanthridine | 30 |
| Lactose | 160 |
| Corn starch | 10 |
| Talcum | 10 |
| Magnesium stearate | 0.2 |

These 210 mg. tablets possess psycholeptic action. They are administered orally in a dosage from 5 to 10 tablets per day in the treatment of conditions of psychotic excitement.

TABLE II

| Ex. | $-N\langle{R_2 \atop R}\rangle N-R_1$ | $R_3, R_4$ | Physical constants |
|---|---|---|---|
| 6 | —N⟩N—CH₃ | 8-Cl | M.P. of the base, 135–137° C. (from E/P). |
| 7 | —N⟩N—CH₃ | 3-Cl | M.P. of the base, 202–204° C. (from C/P). |
| 8 | —N⟩N—CH₃ | 2-Cl | M.P. of the base, 163–164.5° C. (from E/P). |
| 9 | —N⟩N—(CH₂)₂—OH | H | M.P. of the base, 143–145 °C. (from A/P). |
| 10 | —N⟩N—(CH₂)₂—O—CO—CH₃ | H | M.P. of the base, 105–107° C. (from A/P). |
| 11 | —N⟩NH | H | M.P. of the base, 110–111° C. (from A/E). |
| 12 | —N⟩NH | 8-CH₃ | M.P. of the base, 182–183° C. (from A/P). |
| 13 | —N⟩N—(CH₂)₂—OH | 8-CH₃ | M.P. of the maleate, 157–161° C. (from A/E). |

Production of tablets

For the manufacture of tablets, the products of this invention can be mixed with lactose and granulated with water, 0.5% sodium alginate or 1% gelatine solution. The dried granulate is compressed into tablets in the presence of about 5% of talcum, 5% of corn starch and 0.1% of magnesium stearate. In this way, there are obtained, e.g. tablets of the following composition:

A

| | Mg. |
|---|---|
| 6-(4-methyl-1-piperazinyl)-8-chloromorphanthridine | 10 |
| Lactose | 80 |
| Corn starch | 5 |
| Talcum | 5 |
| Magnesium stearate | 0.1 |

These 100 mg. tablets possess psycholeptic action. They are administered orally in a dosage of 3 to 6 tablets per day in the treatment of patients suffering from psychotic excitement.

We claim:
1. A compound selected from the class consisting of (A) 6-basic substituted morphanthridines of the formula:

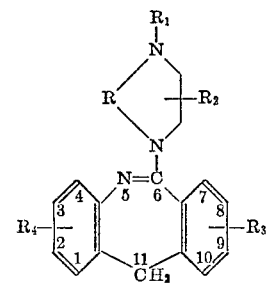

wherein R denotes a member of the group consisting of ethylene, trimethylene, and methylethylene, $R_1$ is a member of the class consisting of hydrogen, lower alkyl, lower hydroxyalkyl, acetoxy lower alkyl, and alkoxyalkyl having not more than 5 carbon atoms, $R_2$ denotes a member of the class consisting of hydrogen and methyl, and $R_3$ and $R_4$ are the same or different and denote members of the class consisting of hydrogen, halogen, and lower alkyl; and (B) physiologically acceptable acid addition salts of (A).

2. 6-(4-methyl-1-piperazinyl)-morphanthridine, as in claim 1.

3. 3-chloro-6-(4-methyl-1-piperazinyl)-morphanthridine, as in claim 1.

4. 6-(4-methyl-1-piperazinyl)-8-chloro-morphanthridine, as in claim 1.

5. 6-(4-methyl-1-piperazinyl)-8-methyl-morphanthridine, as in claim 1.

References Cited

Hunziker et al., Helv. Chim. Acla., vol. 49(5), pp. 1433–9 (1966).

H. R. JILES, *Primary Examiner*.

UNITED STATES PATENT OFFICE
CERTIFICATE OF CORRECTION

Patent No. 3,389,139

June 18, 1968

Jean Schmutz et al.

It is certified that error appears in the above identified patent and that said Letters Patent are hereby corrected as shown below:

Column 1, line 42, "acid" should read -- action --.

Signed and sealed this 16th day of December 1969.

(SEAL)
Attest:

Edward M. Fletcher, Jr.
Attesting Officer

WILLIAM E. SCHUYLER, JR.
Commissioner of Patents